US007506054B1

(12) United States Patent
Fuh et al.

(10) Patent No.: US 7,506,054 B1
(45) Date of Patent: Mar. 17, 2009

(54) LOCAL AUTHENTICATION OF A CLIENT AT A NETWORK DEVICE

(75) Inventors: Tzong-Fen Fuh, Fremont, CA (US); Serene H. Fan, Palo Alto, CA (US); Diheng Qu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 10/611,460

(22) Filed: Jun. 30, 2003

Related U.S. Application Data

(63) Continuation of application No. 10/264,655, filed on Oct. 3, 2002, now Pat. No. 6,609,154, which is a continuation of application No. 09/347,433, filed on Jul. 2, 1999, now Pat. No. 6,463,474.

(51) Int. Cl.
  *G06F 15/173* (2006.01)
(52) U.S. Cl. .................................... 709/225
(58) Field of Classification Search .................. 709/225
  See application file for complete search history.

(56) References Cited

U.S. PATENT DOCUMENTS

| 5,689,638 | A | * | 11/1997 | Sadovsky ..................... 726/21 |
| 5,826,014 | A | * | 10/1998 | Coley et al. .................. 726/12 |
| 5,828,833 | A | * | 10/1998 | Belville et al. ............... 726/11 |
| 5,944,823 | A | * | 8/1999 | Jade et al. .................... 726/15 |
| 5,960,177 | A | * | 9/1999 | Tanno ......................... 709/229 |
| 5,991,807 | A |   | 11/1999 | Schmidt et al. |
| 6,141,687 | A |   | 10/2000 | Blair |
| 6,167,428 | A | * | 12/2000 | Ellis ............................ 709/201 |
| 6,170,012 | B1 | * | 1/2001 | Coss et al. ................... 709/229 |
| 6,182,142 | B1 |   | 1/2001 | Win et al. |
| 6,212,558 | B1 | * | 4/2001 | Antur et al. ................. 709/221 |
| 6,216,121 | B1 | * | 4/2001 | Klassen ........................ 707/1 |

(Continued)

OTHER PUBLICATIONS

Welcher, Peter J.; Reflexive Access Lists; May 5, 1999; Chesapeake NETCRAFTSMEN.*

(Continued)

*Primary Examiner*—Kenny S Lin
*Assistant Examiner*—Brian P Whipple
(74) *Attorney, Agent, or Firm*—Hickman Palermo Truong & Becker LLP

(57) ABSTRACT

A method and apparatus that provide network access control are disclosed. In one embodiment, a network device is configured to intercept network traffic initiated from a client and directed toward a network resource, and to locally authenticate the client. Authentication is carried out by comparing information identifying the client to authentication information stored in the network device. In one embodiment, an authentication cache in the network device stores the authentication information. If the client identifying information is authenticated successfully against the stored authentication information, the network device is dynamically re-configured to allow network traffic initiated by the client to reach the network resource. If local authentication fails, new stored authentication is created for the client, and the network device attempts to authenticate the client using a remote authentication server. If remote authentication is successful, the local authentication information is updated so that subsequent requests can authenticate locally. As a result, a client may be authenticated locally at a router or similar device, reducing network traffic to the authentication server.

30 Claims, 9 Drawing Sheets

U.S. PATENT DOCUMENTS

| | | | |
|---|---|---|---|
| 6,219,706 B1 | 4/2001 | Fan et al. | |
| 6,233,576 B1 | 5/2001 | Lewis | |
| 6,233,618 B1 | 5/2001 | Shannon | |
| 6,243,815 B1 * | 6/2001 | Antur et al. | 726/11 |
| 6,263,369 B1 | 7/2001 | Sitaraman et al. | |
| 6,292,798 B1 | 9/2001 | Dockter et al. | |
| 6,292,904 B1 | 9/2001 | Broomhall et al. | |
| 6,298,383 B1 | 10/2001 | Gutman et al. | |
| 6,301,667 B1 * | 10/2001 | Digiacomo et al. | 726/14 |
| 6,317,838 B1 * | 11/2001 | Baize | 726/11 |
| 6,434,700 B1 | 8/2002 | Alonso et al. | |
| 6,442,588 B1 * | 8/2002 | Clark et al. | 709/203 |
| 6,526,444 B1 | 2/2003 | Blair | |
| 6,609,154 B1 * | 8/2003 | Fuh et al. | 709/225 |
| 6,643,778 B1 * | 11/2003 | Nakazawa | 726/11 |
| 6,668,283 B1 * | 12/2003 | Sitaraman et al. | 709/229 |
| 7,047,275 B1 * | 5/2006 | Ellis | 709/201 |
| 2004/0215931 A1 * | 10/2004 | Ellis | 712/36 |

OTHER PUBLICATIONS

Cisco Systems, Inc.; Configuring IP Access Lists; (No Date); Cisco Systems, Inc.*

Cisco Systems, Inc.; Release Notes for the Cisco 1000 Series Routers for Cisco IOS Release 11.3; Mar. 2, 1998; Cisco Systems, Inc.*

* cited by examiner

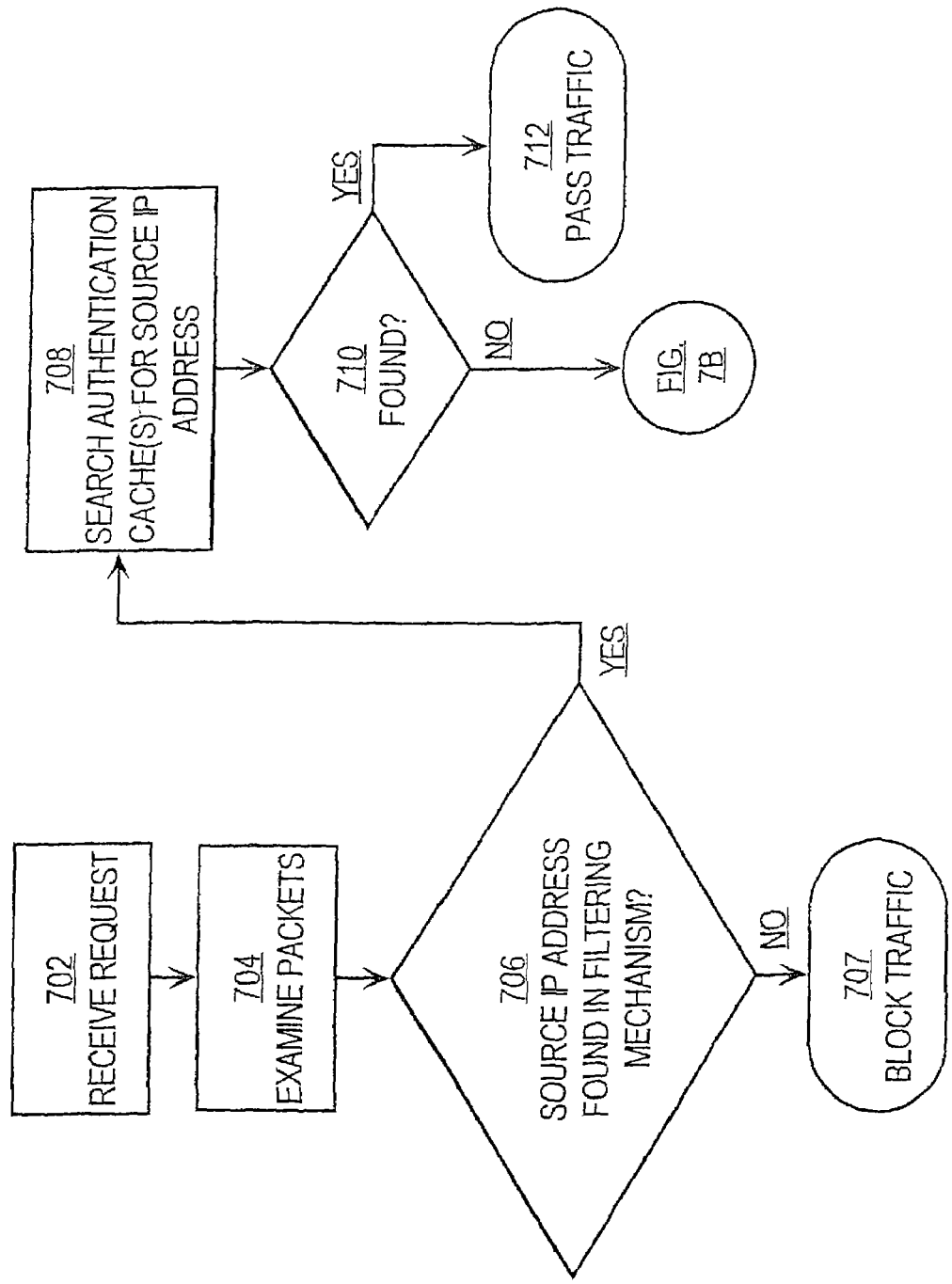

LOCAL AUTHENTICATION OF A CLIENT AT A NETWORK DEVICE

CROSS-REFERENCE TO RELATED APPLICATIONS; PRIORITY CLAIM

This application claims priority under 35 U.S.C. §120 as a Continuation of prior application Ser. No. 10/264,655, filed on Oct. 3, 2002 now U.S. Pat. No. 6,69,154, which is a Continuation of prior application Ser. No. 09/347,433, filed Jul. 2, 1999, now U.S. Pat. No. 6,463,474, the entire contents of which are hereby incorporated by reference as if fully set forth herein.

FIELD OF THE INVENTION

The present invention generally relates to management of computer networks, and relates more specifically to authentication and authorization mechanisms for network devices such as routers and firewalls.

BACKGROUND OF THE INVENTION

Computer users often access information, computer files, or other resources of computer networks from locations that are geographically or logically separate from the networks. This is referred to as remote access. For example, a user of a host or client that is part of a local area network ("LAN") may want to retrieve information that resides on a computer that is part of a remote network. Before a user can gain access to that computer, the user must first obtain permission to do so. In the interest of data integrity, and data confidentiality, many computer networks have implemented integrity and access control mechanisms to guard against unwanted network traffic or access by unauthorized users. On the other hand, a corporation may institute policies that restrict its employees from accessing certain web sites on the internet while using the corporation's computer resources. For example, Corporation C may disallow access to pornographic web sites. Corporation C's access control mechanism would prevent the employees from accessing such sites.

An example of an access control mechanism is a server that implements authentication, authorization, and accounting ("AAA") functions. Authentication is the process of verifying that the user who is attempting to gain access is authorized to access the network and is who he says he is. Generally, after authentication of a user, an authorization phase is carried out. Authorization is the process of defining what resources of the network an authenticated user can access.

Several authentication and authorization mechanisms are suitable for use with operating systems that are used by network devices, such as the Internetworking Operating System ("IOS") commercially available from Cisco Systems, Inc. However, most prior authentication and authorization mechanisms are associated with dial-up interfaces, which can create network security problems. In a dial-up configuration, a remote client uses a telephone line and modem to dial up a compatible modem that is coupled to a server of the network that the remote client wishes to access. In another dial-up Configuration, a remote client first establishes a dial-up connection to a server associated with an Internet Service Provider, and that server then connects to the network server through the global, public, packet-switched internetwork known as the Internet. In this configuration, the network server is coupled directly or indirectly to the Internet.

Unfortunately, information requests and other traffic directed at a network server from the Internet is normally considered risky, untrusted traffic. An organization that owns or operates a network server can protect itself from unauthorized users or from unwanted traffic from the Internet by using a firewall. A firewall may comprise a router that executes a "packet filter" computer program. The packet filter can selectively prevent information packets from passing through the router, on a path from one network to another. The packet filter can be configured to specify which packets are permitted to pass through the router and which should be blocked. By placing a firewall on each external network connection, an organization can prevent unauthorized users from interfering with the organization's network of computers. Similarly, the firewall can be configured to prevent the users of the organization's network of computers from accessing certain undesirable web sites on the Internet.

One common method of remote access using the Internet is telnet, a protocol used to support remote login sessions that defines how local and remote computers talk to each other to support a remote login session "Telnet" is also the name of a remote login program commonly used in networks based on Transmission Control Protocol/Internet Protocol ("TCP/IP"), a set of protocols that define how communications occur over the Internet. Past authentication and authorization mechanisms were produced to work with firewalls in the context of telnet. An example of an authentication and authorization mechanism that works with telnet is "Lock and Key" for IOS, commercially available from Cisco Systems, Inc.

However, a major drawback of telnet is that the client must know, before making any connection request, the Internet Protocol address ("IP address") of the firewall that is protecting the target network which the client is attempting to access. An IP address is a unique 32-bit binary number assigned to each firewall, router, host computer or other network element that communicates using IP. Obtaining the IP address of a firewall can be inconvenient or impractical because there are so many IP addresses currently assigned to network devices. Further, IP addresses normally are guarded closely by the network owner, because knowledge of an IP address enables unauthorized traffic to reach the device identified by the IP address.

Moreover, once a user successfully uses the authentication and authorization mechanism to secure a logical path through the firewall, the user may be restricted to one type of network traffic for the connection. For example, a firewall can be configured to provide a path through the firewall for a specific type of network traffic as specified by a user profile that is associated with each authenticated user. The user profile contains information on what the user is authorized to do on the network. The user profile may specify, for example, that the user may use only File Transfer Protocol ("FTP") traffic. Thus, the user may use the path through the firewall only for FTP traffic, for the duration of that connection. Furthermore, the user profile associated with the user contains a specific IP address that specifies the host or client from which the user can attempt to secure a logical path through the firewall. Thus, a user is not free to use any one of several computers that may be available to access the target network. Also, the user may not be free to use a client in a network that employs Dynamic Host Configuration Protocol (DHCP). DHCP assigns dynamic IP addresses to the devices on a network. Thus, a client in a DHCP environment can have a different IP address every time it connects to the network.

Based on the foregoing, there is a clear need for a mechanism allowing users to use remote access via the Internet without requiring advance knowledge of the IP address of the firewall router, and without restricting a user to a particular host or client.

In particular, there is a need for an authentication and authorization mechanism in the context of remote access via the Internet that does not rely on telnet and that allows the passage of different types of traffic for a given connection.

SUMMARY OF THE INVENTION

The foregoing needs, and other needs and objects that will become apparent for the following description, are achieved in the present invention, which comprises, in one aspect, a method of controlling access of a client to a network resource using a network device that is logically interposed between the client and the network resource, the method comprising creating and storing client authorization information at the network device, wherein the client authorization information comprises information indicating whether the client is authorized to communicate with the network resource and information indicating, what access privileges the client is authorized to have with respect to the network resource; receiving a request from the client to communicate with the network resource; determining, at the network device, whether the client is authorized to communicate with the network resource based on the authorization information; and reconfiguring the network device to permit the client to communicate with the network resource only when the client is authorized to communicate with the network resource based on the authorization information.

One feature of this aspect is that creating and storing client authorization information comprises the steps of creating and storing in the network device a set of authorization information for each client that communicates with the network device.

According to another feature of this aspect is that creating and storing client authorization information comprises the steps of creating and storing in the network device an authentication cache for each client that communicates with the network device. In another feature, creating and storing client authorization information comprises the steps of creating and storing in the network device a plurality of authentication caches, each authentication cache uniquely associated with one of a plurality of clients that communicate with the network device, each authentication cache comprising information indicating whether the client is authorized to communicate with the network resource and information indicating what access privileges the client is authorized to have with respect to the network resource According to still another feature, determining whether the client is authorized to communicate with the network resource comprises the step of determining whether information in the request identifying the client matches information in a filtering mechanism of the network device and the authorization information stored in the network device.

In another feature, determining whether the client is authorized to communicate with the network resource comprises the steps of: determining whether a source IP address of the client in the request matches information in a filtering mechanism of the network device; and if so, determining whether the source IP address matches the authorization information stored in the network device.

In another feature, determining whether the client is authorized to communicate with the network resource comprises the steps of: determining whether a source IP address of the client in the request matches information in an a filtering mechanism of the network device; determining whether the source IP address matches the authorization information stored in the network device; and when the source IP address fails to match the authorization information stored in the network device, determining if user identifying information received from the client matches a profile associated with the user that is stored in an authentication server that is coupled to the network device.

In another feature, determining whether the client is authorized to communicate with the network resource comprises the steps of: determining whether client identifying information in the request matches information in a filtering mechanism of the network device; determining whether the client identifying information matches the authorization information stored in the network device; and only when the client identifying information fails to match the authorization information stored in the network device, then: creating and storing new authorization information in the network device that is uniquely associated with the client; requesting login information from the client; authenticating the login information by communicating with an authentication server that is coupled to the network device; and updating the new authorization information based on information received from the authentication server.

According to another feature, requesting login information from the client comprises sending a Hypertext Markup Language login form to the client to solicit a username and a user password; and authenticating the login information by communicating with an authentication server that is coupled to the network device comprises determining, from a profile associated with a user of the client stored in the authentication server, whether the username and password are valid.

In another feature, the method further comprises the steps of: creating and storing an inactivity timer for each authentication cache, wherein the inactivity timer expires when no communications are directed from the client to the network resource through the network device during a pre-determined period of time; removing the updated authentication information when the inactivity timer expires.

In another feature, determining whether the client is authorized to communicate with the network resource comprises the steps of: determining whether a source IP address in the request matches information in a filtering mechanism of the network device; determining whether the source IP address matches the authorization information stored in the network device; and only when the source IP address fails to match the authorization information stored in the network device, then: creating and storing in the network device a new authentication cache that is uniquely associated with the client; requesting login information from the client; authenticating the login information by communicating with an authentication server that is coupled to the network device; and updating the new authentication cache based on information received from the authentication server.

According to another feature, reconfiguring the network device comprises the steps of creating and storing one or more commands to the network device whereby one or more interfaces of the network device are modified to permit communications between the client and the network resource.

In another feature, the method further involves instructing the client to reload the network resource that was identified in the request from the client when it is determined that the client is authorized to communicate with the network resource.

According to another feature, the method further comprises the steps of waiting a predetermined period of time, and instructing the client to reload the network resource that was identified in the request from the client when it is determined that the client is authorized to communicate with the network resource.

In another feature, the network device comprising a firewall that protects the network resource by selectively blocking messages initiated by client and directed to the network resource, the firewall comprising an external interface and an internal interface, the firewall comprising an Output Access Control List at the internal interface and an Input Access Control List at the external interface, wherein reconfiguring the network device comprises the step of: substituting the IP address in a user profile information associated with a user of the client to create a new user profile information, wherein the user profile associated with the user of the client is received from an authentication server that is coupled to the network device; and adding the new user profile information as temporary entries to the Input Access Control List at the external interface and to the Output Access Control List at the internal interface.

According to still another feature, the method further involves: creating and storing an inactivity timer for the authorization information, wherein the inactivity timer expires when no communications are directed from the client to the network resource through the network device during a pre-determined period of time; associating the temporary entries with the authorization information and the client; and removing the temporary entries and the authorization information from the network device if the inactivity timer expires.

In another feature, the authorization information includes a table of hashed entries and wherein associating the temporary entries to the authorization information further comprises storing the temporary entries in the table of hashed entries.

In another feature, the network device comprising a firewall that protects the network resource by selectively blocking messages initiated by client and directed to the network resource, the firewall comprising an external interface and an internal interface, the firewall comprising an Output Access Control List at the external interface and an Input Access Control List at the internal interface, wherein reconfiguring the network device comprises the step of: substituting the IP address in a user profile information associated with a user of the client to create a new user profile information, wherein the user profile associated with the user of the client is received from an authentication server that is coupled to the network device; and adding the new user profile information as temporary entries to the Input Access Control List at the internal interface and to the Output Access Control List at the external interface.

In another feature, the method further involves: creating and storing an inactivity timer for the authorization information, wherein the inactivity timer expires when no communications are directed from the client to the network resource through the network device during a pre-determined period of time; associating the temporary entries with the authorization information and the client; and removing the temporary entries and the authorization information from the network device if the inactivity timer expires.

In another feature, the authorization information includes a table of hashed entries and wherein associating the temporary entries to the authorization information further comprises storing the temporary entries in the table of hashed entries.

According to another aspect, the invention encompasses computer system for controlling access of a client to a network resource using a network device that is logically interposed between the client and the network resource, comprising: one or more processors; a storage medium carrying one or more sequences of one or more instructions including instructions which, when executed by the one or more processors, cause the one or more processors to perform the steps of: creating and storing client authorization information at the network device, wherein the client authorization information comprises information indicating whether the client is authorized to communicate with the network resource and information indicating what access privileges the client is authorized to have with respect to the network resource; receiving a request from the client to communicate with the network resource; determining, at the network device, whether the client is authorized to communicate with the network resource based on the authorization information; and reconfiguring the network device to permit the client to communicate with the network resource only when the client is authorized to communicate with the network resource based on the authorization information.

According to another aspect, the invention involves a router that is logically interposed between a client and a network resource and that controls access of the client to the network resource, comprising: one or more processors; a storage medium carrying one or more sequences of one or more instructions including instructions which, when executed by the one or more processors, cause the one or more processors to perform the steps of: creating and storing client authorization information at the router, wherein the client authentication information comprises information indicating whether the client is authorized to communicate with the network resource and information indicating what access privileges the client is authorized to have with respect to the network resource; receiving a request from the client to communicate with the network resource; determining, at the router, whether the client is authorized to communicate with the network resource based on the authorization information; and reconfiguring the router to permit the client to communicate with the network resource only when the client is authorized to communicate with the network resource based on the authorization information.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7A is a flow diagram of a process of proxy authentication;

DETAILED DESCRIPTION OF THE PREFERRED EMBODIMENT

Figure 1:
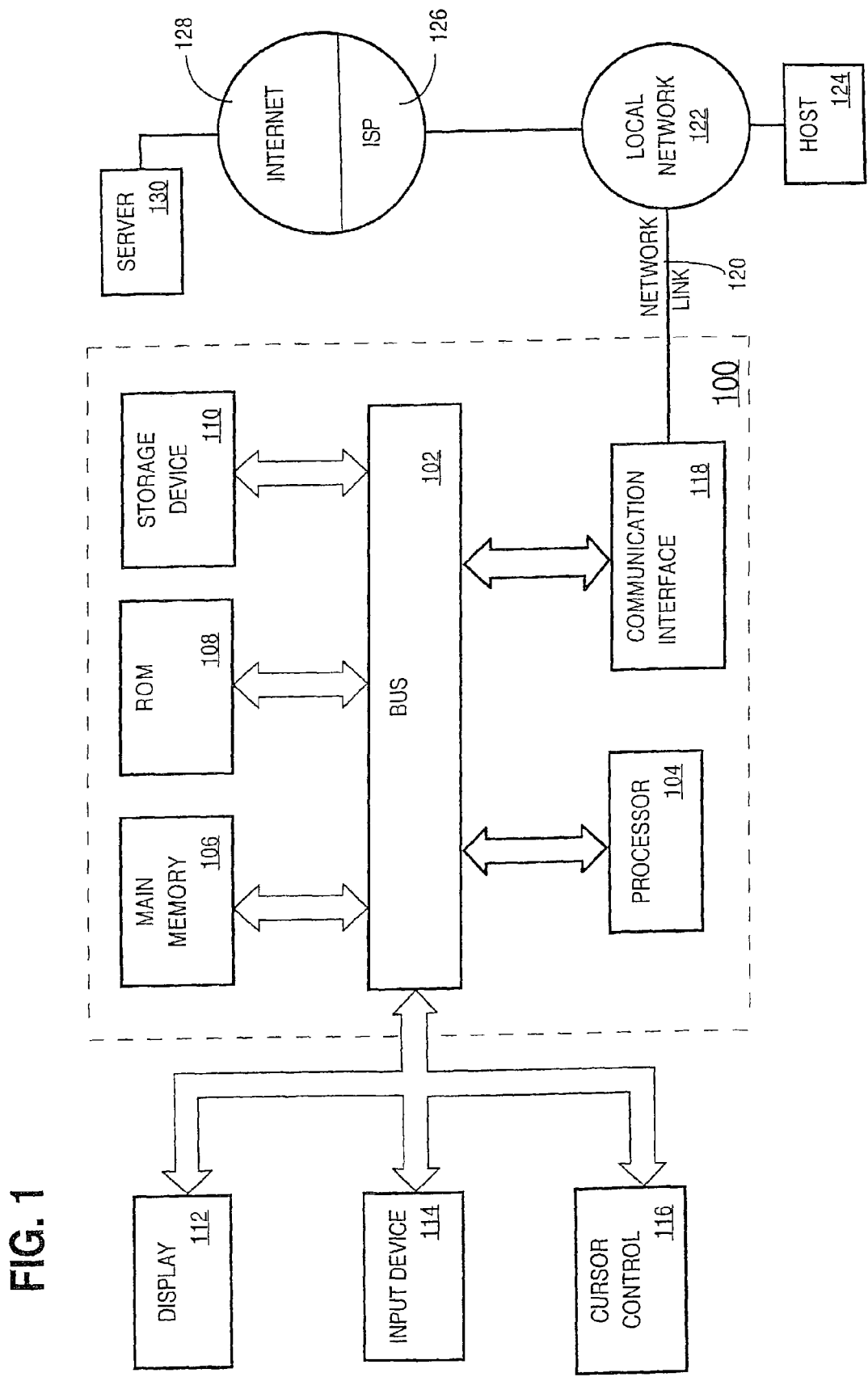
FIG. 1 is a block diagram that illustrates a computer system upon which an embodiment may be implemented.

A method and apparatus for authentication and authorization proxy mechanisms for firewalls that protect networks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

The present invention may be implemented using various client protocols such as Telnet, File Transfer Protocol (FTP), or HyperText Transfer Protocol (HTTP). For purposes of illustration, the invention is described in the context of an HTTP client protocol.

In one embodiment, a user of a client that is part of a local area network ("LAN") attempts to remotely access a server ("target server") or some other resource, such as a peer client or device. The target server and or peer are part of a packet-switched private network that operates using TCP/IP and other Internet standards ("intranet"). The client is connected to the Internet through the LAN, and the intranet is also connected to the Internet. Alternatively, the client may be a stand-alone computer connected to the Internet through a dial-up connection or a digital communication service such as an Integrated Services Digital Network (ISDN) connection. In another embodiment, a user of a client from within the intranet attempts to access a target server or other resource that is not part of the same intranet as that of the client.

When the target server executes an HTTP server, the client can remotely access the target server over the Internet by using a Web browser to specify a Web page on the target server. Using a Web browser to specify a Web page is hereafter referred to as an "HTTP request" or as "transmitting HTTP packets." A Web page of the target server may be accessed using identifying information, such as a Uniform Resource Locator ("URL") and therefore the Web page is sometimes called the "target URL."

The HTTP packets are intercepted by a firewall that protects the intranet from unwanted network traffic originating from the Internet (inbound traffic) and can prevent users of clients from within the intranet from accessing undesirable web sites on the Internet (outbound traffic). For purposes of illustration, use of an embodiment with inbound traffic is described in further detail below.

Upon intercepting the HTTP packets, the firewall requests, from the client, authentication information such as username and password. In response to receiving the authentication information, the firewall performs an authentication and authorization process. If the username is successfully authenticated, then the firewall is dynamically configured to open a passageway for the HTTP packets as well as other types of network traffic initiated from the user on the client. The other types of network traffic that are permitted through the passageway are specified in a user profile for that particular user. In this context, "open a passageway" means that the firewall re-configures itself, in response to successful authentication, so that packets that would otherwise be barred are now allowed to pass.

In this configuration, the firewall provides an authentication and authorization mechanism that substitutes for an authentication and authorization mechanism elsewhere in the network. Accordingly, the mechanism described in this document is referred to as an "Authentication Proxy." The Authentication Proxy may comprise one or more software components, executed by a router. In one embodiment, the Authentication Proxy can be enabled on a router interface to intercept traffic initiated from a client that is not yet authenticated. The Authentication Proxy is responsible for validating the user associated with the client and for applying the appropriate user profile to the router interface. The authentication and authorization process and the dynamic configuration of the firewall are described in further detail below.

Figure 2:
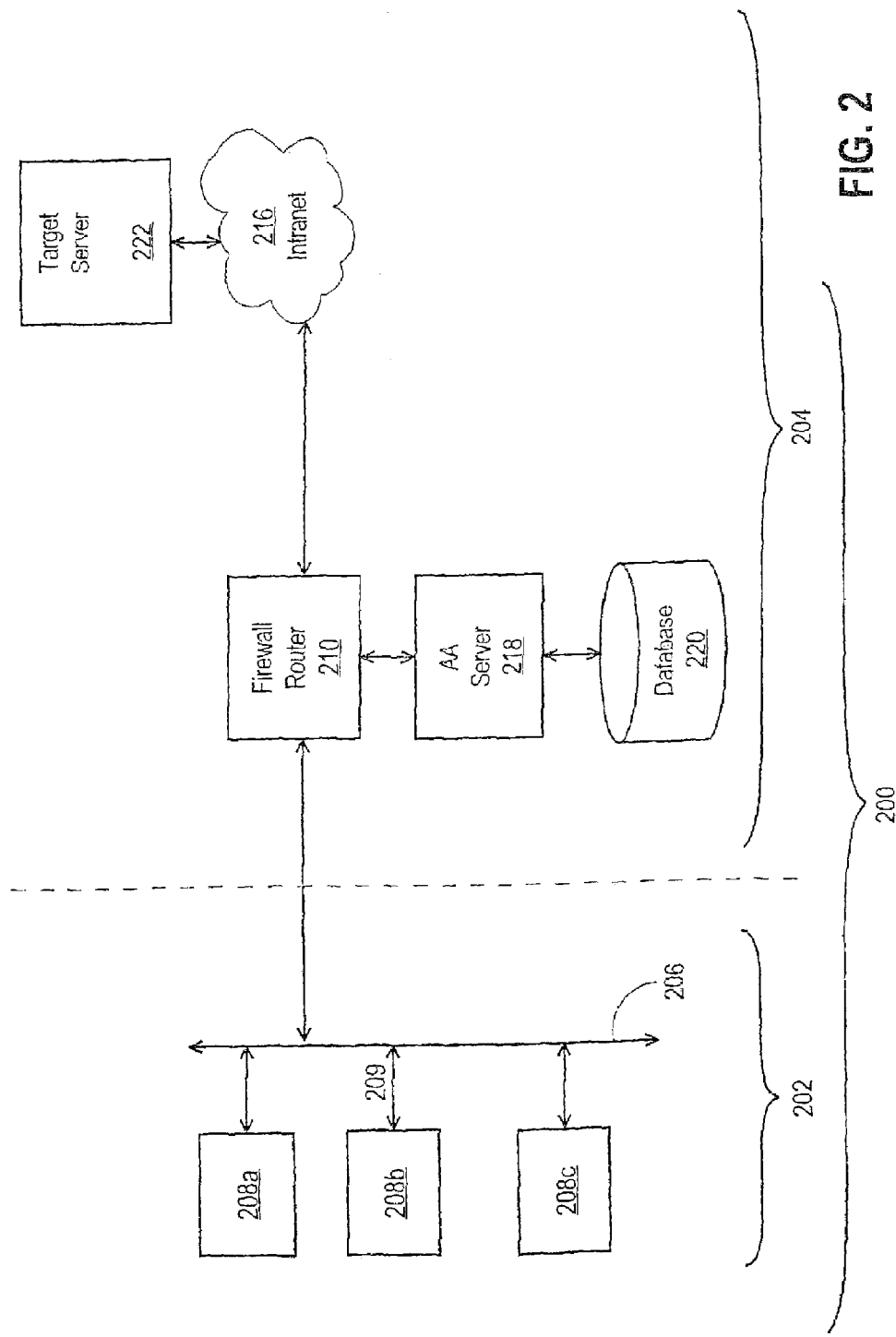
FIG. 2 is a block diagram of a system providing an authentication proxy in a network environment.

FIG. 2 is a block diagram of a system 200 in which an embodiment of an Authentication Proxy can be used. Generally, system 200 includes a LAN 206, and a local, packet-switched network that uses Internet protocols, or intranet, 216. The LAN 206 and the intranet are both connected to a global network such as the Internet. The LAN 206 and intranet 216 are respectively located in logically distinct regions, such as first region 202 and second region 204, which may be geographically separate. A firewall router 210 is logically interposed between LAN 206 and the intranet 216.

LAN 206 is a local area network comprising any number of network devices 208a, 208b, 208c interconnected by one or more communications channels 209. Ethernet, Token Ring, other protocols can characterize the communications channels 209.

Firewall router 210 is a specialized router that carries out firewall functions. The firewall router 210 is coupled to intranet 216, and an authentication and authorization server 218 ("AAA server"). The firewall router 210 controls remote access to intranet 216. AAA server 218 is a computer, or a group of hardware or software components or processes that cooperate or execute in one or more computer systems. The AAA server 218 has access to a database 220 that stores authentication and authorization information on users ("user profile"). The firewall router 210 cooperates with the AAA server 218 to perform authentication and authorization services. In this way, firewall router 210 restricts and controls access of traffic originating from intranet 216 and directed to LAN 206.

Intranet 216 is one or more interconnected networks ("internetwork") each of which may comprise any number of network devices. A target server 222 is part of Intranet 216 and is a computer system that may be remotely accessed by a client on LAN 206. In certain embodiments, the AAA server 218 and database 220 may be coupled indirectly to firewall router 210 through the Internet. In this configuration, the AAA server 218 and database 220 are said to be one or more "hops" removed from the firewall router 210. A hop is the next place in the network to send a packet so that a packet will eventually reach its destination.

Figure 3:
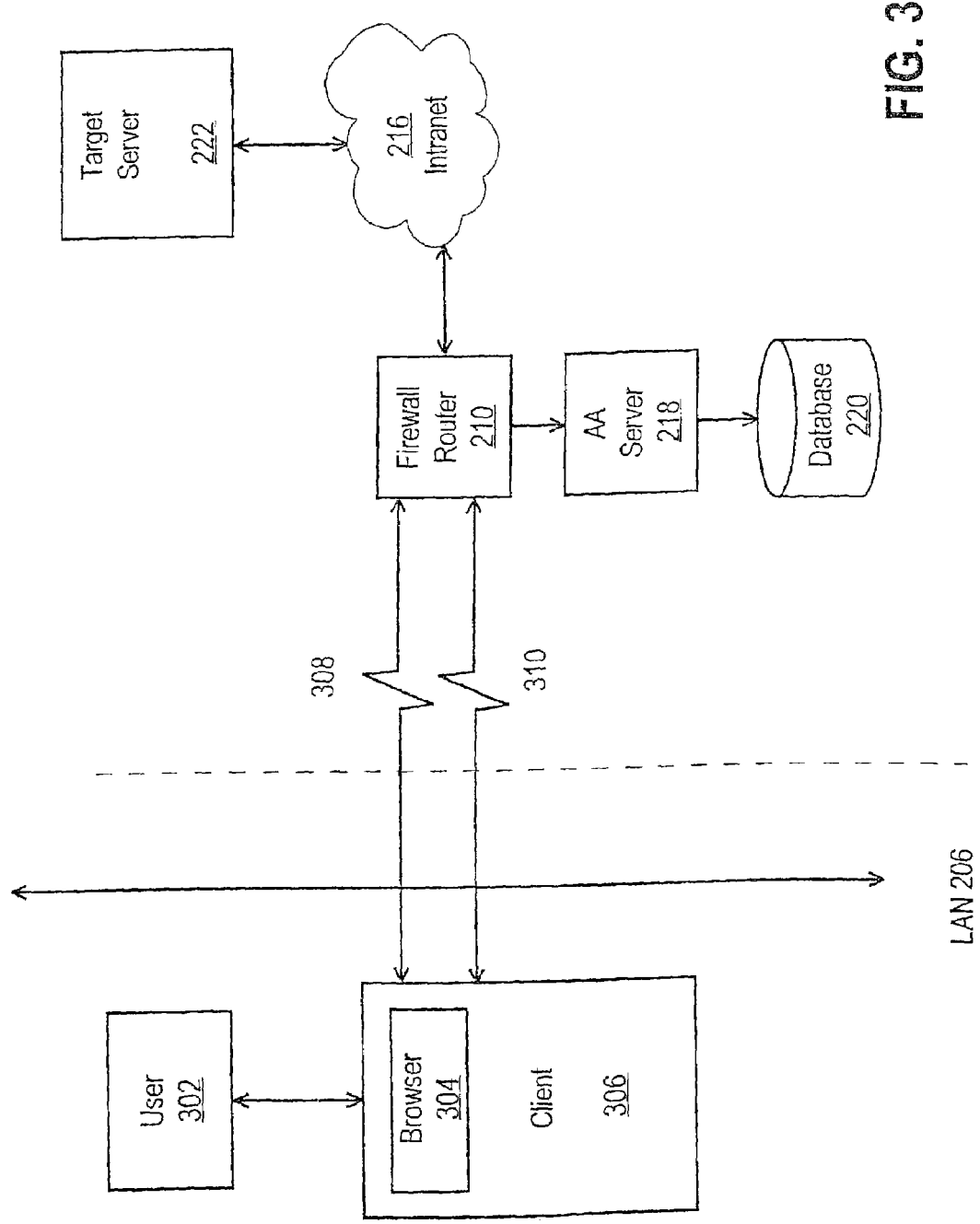
FIG. 3 is a block diagram of the system in FIG. 2 showing certain internal details.

FIG. 3 is a block diagram showing certain internal details of the system in FIG. 2. In this example, one of the network devices 208a-208c of LAN 206 is a client 306, such as a personal computer or workstation. Client 306 is associated with a user 302. In certain embodiments, client 306 is configured with or coupled to multiple modems or ISDN bearer channels that can be used to establish One or more connections 308, 310 from client 306 to firewall router 210. In one embodiment, client 306 runs a browser 304, which is an application program used to retrieve and display Web pages or other information stored in target server 222. Commercial examples of browser 304 include Netscape Navigator® or Microsoft Internet Explorer®. User 302 can use browser 304 to send an HTTP request over LAN 206 and Intranet 216 to target server 222.

Authentication and Authorization

Figure 4:
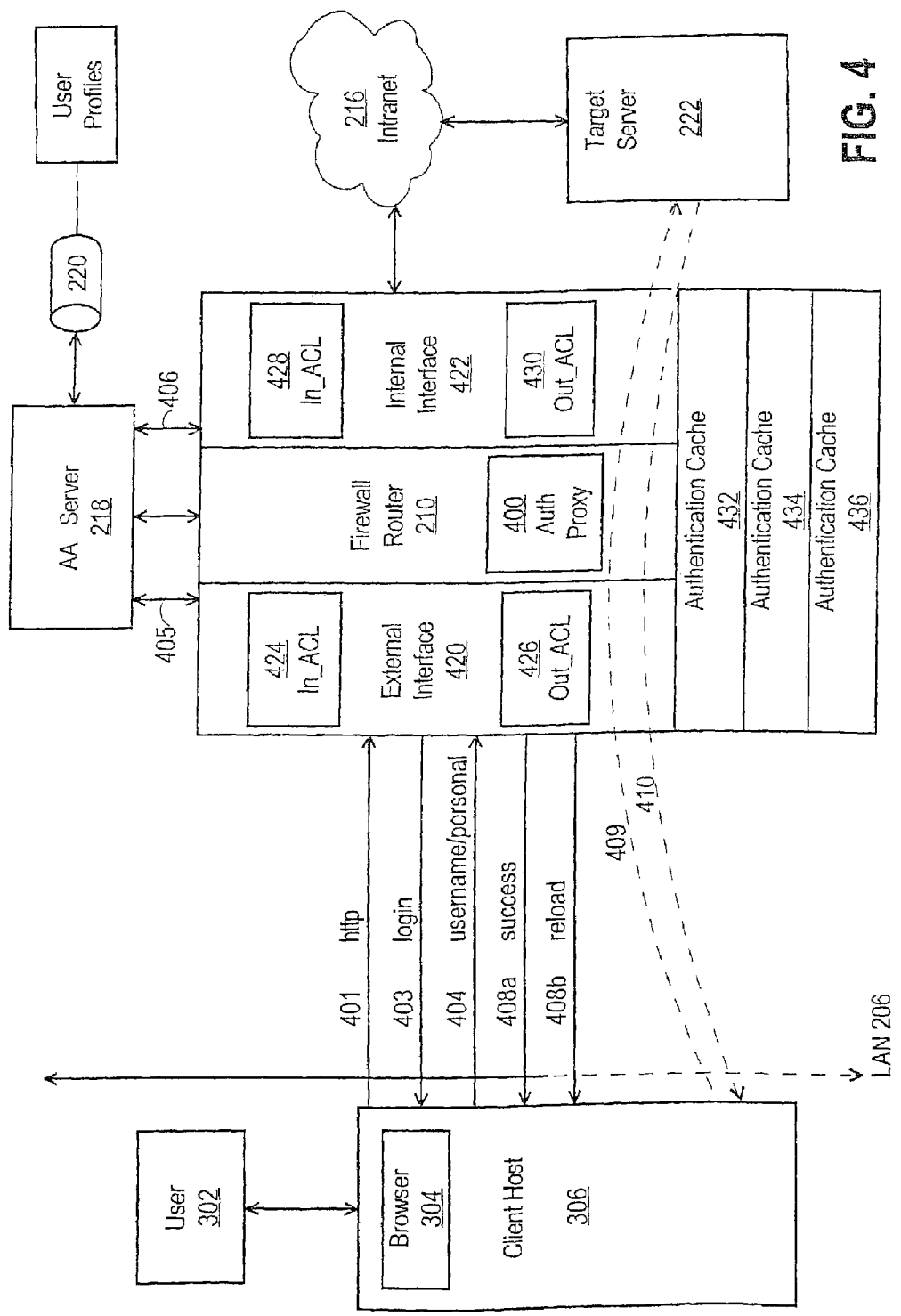
FIG. 4 is a block diagram of the system in FIG. 3 showing certain paths of network traffic.

FIG. 4 is a block diagram of the system of FIG. 3 that illustrates providing an Authentication Proxy.

Figure 7B:
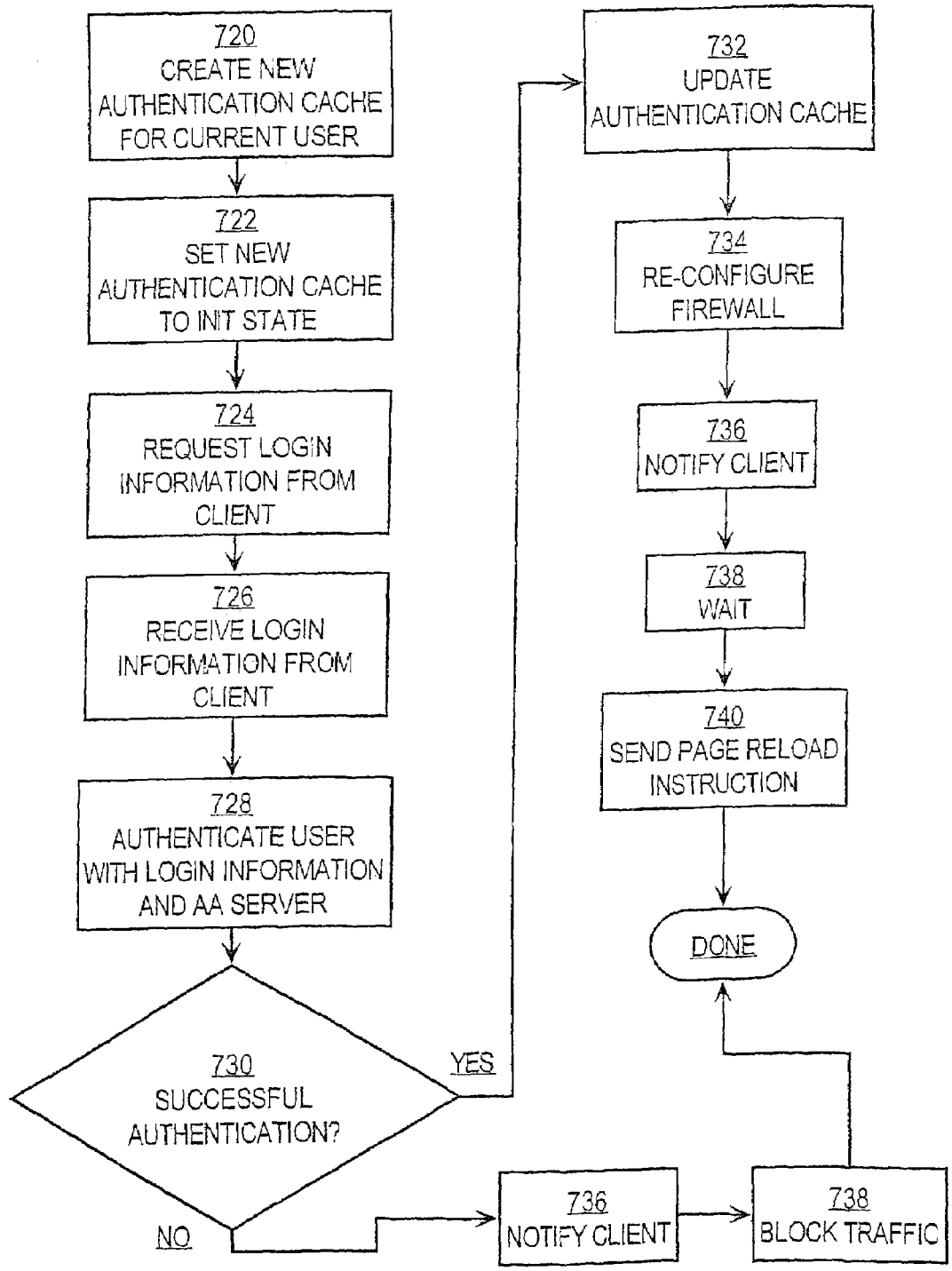
FIG. 7B is a flow diagram of further steps in the process of FIG. 7A.

FIG. 7A and FIG. 7B are flow diagrams that illustrate a method for carrying out proxy authentication at a router. As an example, the method of FIG. 7A and FIG. 7B is described below in the context of the system of FIG. 4. However, the method is not limited to this context.

As in FIG. 3, the system of FIG. 4 includes User 302 who is associated with Client 306. A Browser 304 is executed by Client 306, which is part of LAN 206. Client 206 communicates with firewall router 210 over LAN 206 using messages illustrated by paths 401, 403, 404, 408a, 408b. Firewall router 210 is coupled to client 306, to AAA Server 218, and to intranet 216. One function of Client 306 is to request and retrieve electronic documents, applications or services that are available at target server 222.

A filtering mechanism 219 is part of the configuration of Authentication Proxy 400. The filtering mechanism 219 contains information identifying one or more IP addresses of clients that are authenticated in the network to which the firewall 210 belongs.

Paths of network traffic are depicted by solid lines or dotted lines with arrowheads. Paths 401, 403, 404, 408a, 408b illustrate network traffic communicated between client 306 and firewall router 210. Paths 405 and 406 illustrate network traffic communicated between firewall router 210 and AAA server 218. Paths 409 and 410 illustrate network traffic communicated between the client 306 and target server 222. Each path represents one or more packets, messages or sessions communicated among the respective end elements. Paths 409 and 410 pass through firewall router 210 but do not stop within the firewall router.

Firewall router 210 has an external interface 420 and an internal interface 422. Each interface 420, 422 defines how firewall router 210 regulates the flow of traffic arriving at or sent from the respective interface. The external interface 420 includes an input Access Control List ("ACL") 424, and an output ACL 426. Internal interface 422 also includes an input ACL 428 and an output ACL 430.

Access control lists filter packets and can prevent certain packets from entering or exiting a network. Each ACL is a list of information that firewall router 210 may use to determine whether packets arriving at or sent from a particular interface may be communicated within or outside the firewall router. For example, in an embodiment, input ACL 424 may comprise a list of IP addresses and types of allowable client protocols. Assume that firewall router 210 receives an inbound packet from client 306 at external interface 420 that is intended for target server 222. If the IP address of client 306 is not stored in input ACL 424, then firewall router 210 will not forward the packet further within the circuitry or software of the firewall router. Output ACL 426 similarly controls the delivery of packets from firewall router 210 to resources located outside external interface 420. Input ACL 428 and output ACL 430 govern packet flow to or from internal interface 422.

The firewall router 210 also includes any number of authentication caches 432, 434. The access control lists are linked to the authentication caches. Each authentication cache represents a valid user authentication. Each authentication cache may include a table of hashed entries of information such as a source IP address, a destination IP address, a source port value, a destination port value, and state information.

Firewall router 210 also includes Authentication Proxy 400. In one embodiment, Authentication Proxy 400 is one or more software elements, modules or processes executed by firewall router 210 and coupled to the external interface 420, internal interface 422, and authentication caches 432, 434. Authentication Proxy 400 may be configured to carry out the functions described in this document.

Authentication

In an embodiment, Authentication Proxy 400 is activated or enabled at the firewall router 210. Authentication Proxy 400 may be implemented as a software process within firewall router 210 that may be accessed using commands in a standard command-line router programming language.

For purposes of illustrating an example of operation of authentication proxy 400, assume that Authentication Proxy 400 receives a request for something in a network that is protected by the Authentication Proxy, as shown by block 702 of FIG. 7A. For example, User 302 uses browser 304 to send an HTTP request from client 306 for an electronic document, application or resource available at target server 222. User 302 is not authenticated in intranet 216. The HTTP request travels along path 401 from client 306 to firewall router 210. Each packet of an HTTP request includes a header portion that contains one or more fields of information. The fields include, among other things, values for source IP address and destination IP address of that packet.

In block 704, packets of the request are examined. For example, when the HTTP request arrives at the external interface 420 of the firewall router 210, Authentication Proxy 400 examines packets of the request. In block 706, the process determines whether a source IP address of the request is found in the standard access control list. For example, Authentication Proxy 400 determines whether the source IP address in the header field of the packets corresponds to any entry in the filtering mechanism 219 configured in the Authentication Proxy 400.

If the test of block 706 is affirmative, then control passes to block 708 in which the authentication caches are searched for the source IP address. In block 710, the process tests whether the source IP address is found. For example, if Authentication Proxy 400 determines that the source IP address matches at least one IP address stored in the filtering mechanism 219, then the Authentication Proxy 400 attempts to authenticate the user 302. In the preferred embodiment, Authentication Proxy 400 searches authentication caches 432, 434 for the source IP address. The goal of this search is to determine if the source IP address of the HTTP packet corresponds to an entry in any of the authentication caches 432, 434.

Assume that the filtering mechanism 219 contains a source IP address that matches the IP address of client 306, so that the test of block 706 is affirmative. However, User 302 is not yet authenticated, so that the test of block 710 is negative. Thus, the authentication caches have no hashed entries that match the source IP address found in the header field of the HTTP packet. As a result, without further action the firewall router 210 will intercept and will not forward the HTTP packet, instead of providing it with a logical passageway through the router.

Figure 6:
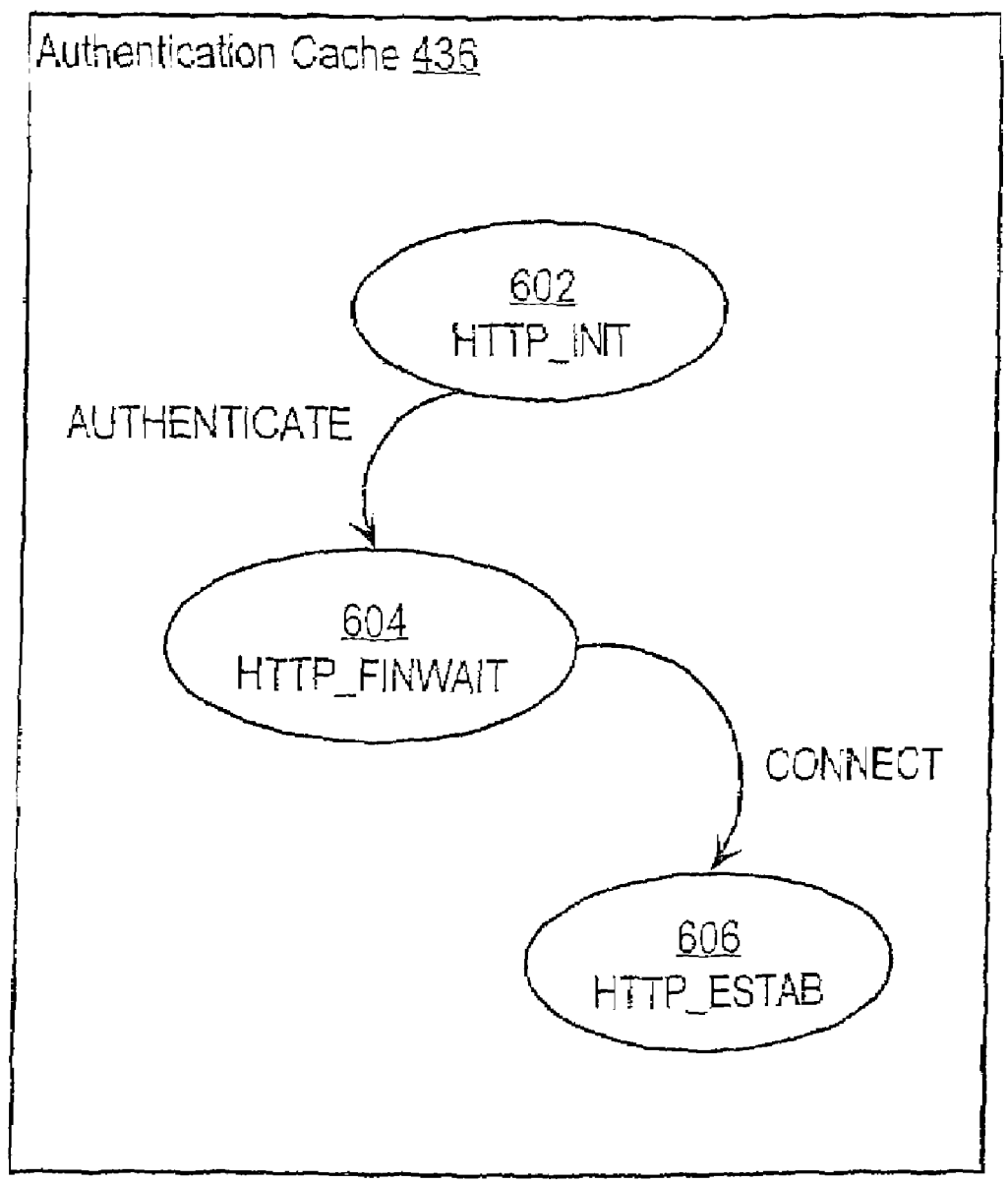
FIG. 6 is a state diagram of states in which an authentication cache may execute.

In one embodiment, at this stage, control is passed to block 720 of FIG. 7B. Preferably, a new authentication cache 436 is created for User 302, as shown in block 720. Each authentication cache may operate in a plurality of states. FIG. 6 is a state diagram that illustrates the states in which an authentication cache may operate. Initially, the state of the new authentication cache 436 is set to the HTTP_Init state 602, as shown by block 722. The HTTP_Init state 602 indicates that the authentication and authorization state for User 302 is at an initial state. In one embodiment, an HTTP packet is provided with a logical passageway through the firewall router 210 only when the state of an authentication cache that contains information about User 302 is set to the HTTP_Estab state 606, which is described further below.

If the source IP address of the HTTP packet from client 306 does not match any of the entries in the filtering mechanism 219, then Authentication Proxy 400 denies passage to the HTTP packet and makes no attempt at authentication, as shown by block 707 of FIG. 7A. As a result, advantageously, the packet is turned away at the interface and never reaches internal software and hardware elements of the firewall router.

If Authentication Proxy 400 is not configured with the filtering mechanism 219, then Authentication Proxy 400 will intercept traffic, for purposes of authentication, from all hosts whose connection initiating packets arrive at a firewall interface for which Authentication Proxy 400 has been enabled. It is not practical or desirable to attempt authentication for every packet that arrives at the firewall. For example, there is no point in authenticating packets that arrive from sites known to be hostile or sites of an unknown nature. Thus, in one embodiment, a filtering mechanism is defined to enable the Authentication Proxy 400 to bypass traffic from such sites.

Referring again to FIG. 7B, after the new authentication cache is created, login information is requested from the client, as shown in block 724. For example, Authentication Proxy 400 obtains authentication information from User 302 by sending a login form to client 306. The login form is an electronic document that requests User 302 to enter username and password information, as shown by path 403.

Figure 5A:
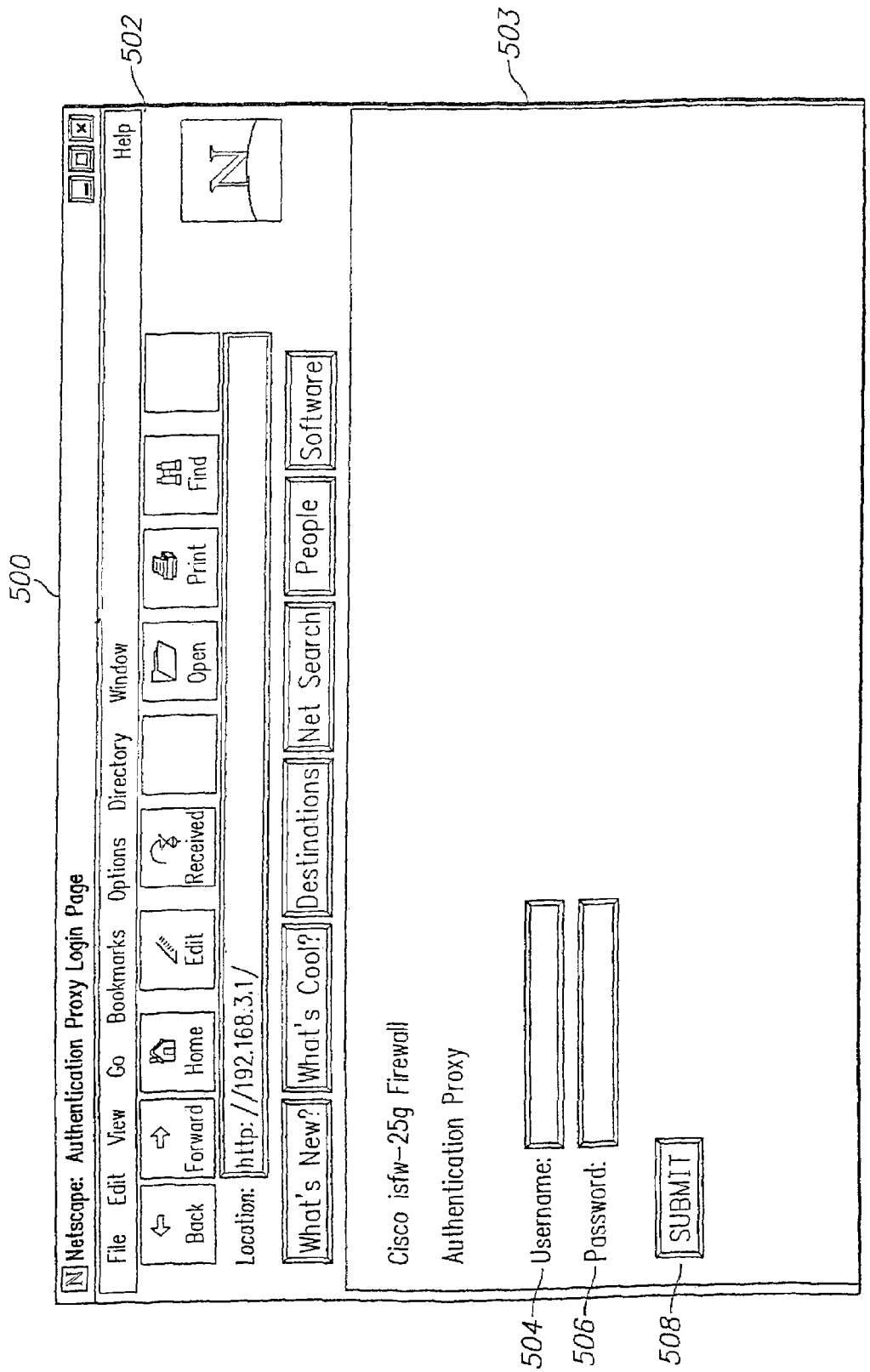
FIG. 5A illustrates a display of a graphical user interface containing a dialog box for soliciting a username and password.

FIG. 5A is an example of a graphical user interface ("GUI") representation of the login form 500 that may be sent by Authentication Proxy 400. The form 500 may be displayed by browser 304, as indicated by command area 502. Form 500 also includes a data entry pane 503 having a Username field 504, and a Password field 506. A User 302 may enter username information in Username field 504 and may enter password information in Password field 506. To communicate the username and password information to Authentication Proxy 400, the user selects a "Submit" button 508. In response, the login information is communicated to firewall router 210, as indicated by path 404.

The login form may be composed using the HyperText Markup Language ("HTML") format. Table 1 presents source code for an appropriate HTML document that may be used for the login form of FIG. 5A.

TABLE 1

EXAMPLE LOGIN FORM

```
<HTML>
  <HEAD>
    <TITLE>
      Authentication Proxy Login Page
    </TITLE>
  </HEAD>
  <BODY BGCOLOR=#FFFFFF>
    <H1>Cisco "router name" Firewall<H1>
    <H2>Authentication Proxy<H2><BR><BR><P><P><P>
    <FORM METHOD=POST ACTION=\"\">
    <INPUT TYPE=HIDDEN NAME=TIMETAG VALUE=>
      Username: <INPUT TYPE=TEXT NAME=UNAME><BR><BR>
      Password: <INPUT TYPE=PASSWORD NAME=PWD><BR><BR>
    <INPUT TYPE=SUBMIT NAME=SUBMIT VALUE=SUBMIT>
    </FORM>
  </BODY>
</HTML>
```

Login information is received from the client, as shown by block 726. Block 726 may involve receiving username and password information in an HTTP message that is generated when a user fills in and submits the form of Table 1. In block 728, the user is authenticated using the login information and the AAA server 218. For example, upon receipt of the username and password information, Authentication Proxy 400 attempts to authenticate the user by sending the username and password to the AAA server 218, as shown by path 405. AAA server 218 has access to database 220, which contains user profiles of authorized users.

In block 730, the process tests whether authentication is successful. Successful authentication will occur when AAA server 218 verifies that the usernarnme and password information are recognized and correct. If Authentication Proxy 400 successfully authenticates User 302 using AAA Server 218, then AAA server 218 informs firewall router 210 of the successful authentication, as shown by path 406. In block 732, the process updates the current authentication cache with the source IP address of the client and with information contained in the user profile of User 302. In block 734, the firewall is re-configured to allow packets using protocols specified in user's profile of User 302 and associated with that IP address to pass through the firewall freely. Block 734 may involve creating and executing one or more router commands. In this way, subsequent authentication attempts against the authentication cache at the firewall will succeed, precluding the need to connect to AAA Server 218 repeatedly. This provides a significant advantage and improvement in authentication speed and efficiency.

Authentication Proxy 400 then informs Client 306 that authentication succeeded. As shown in block 736, the client is notified. In the preferred embodiment, Authentication Proxy 400 sends an HTML page containing a success message, as shown by path 408a.

Figure 5B:
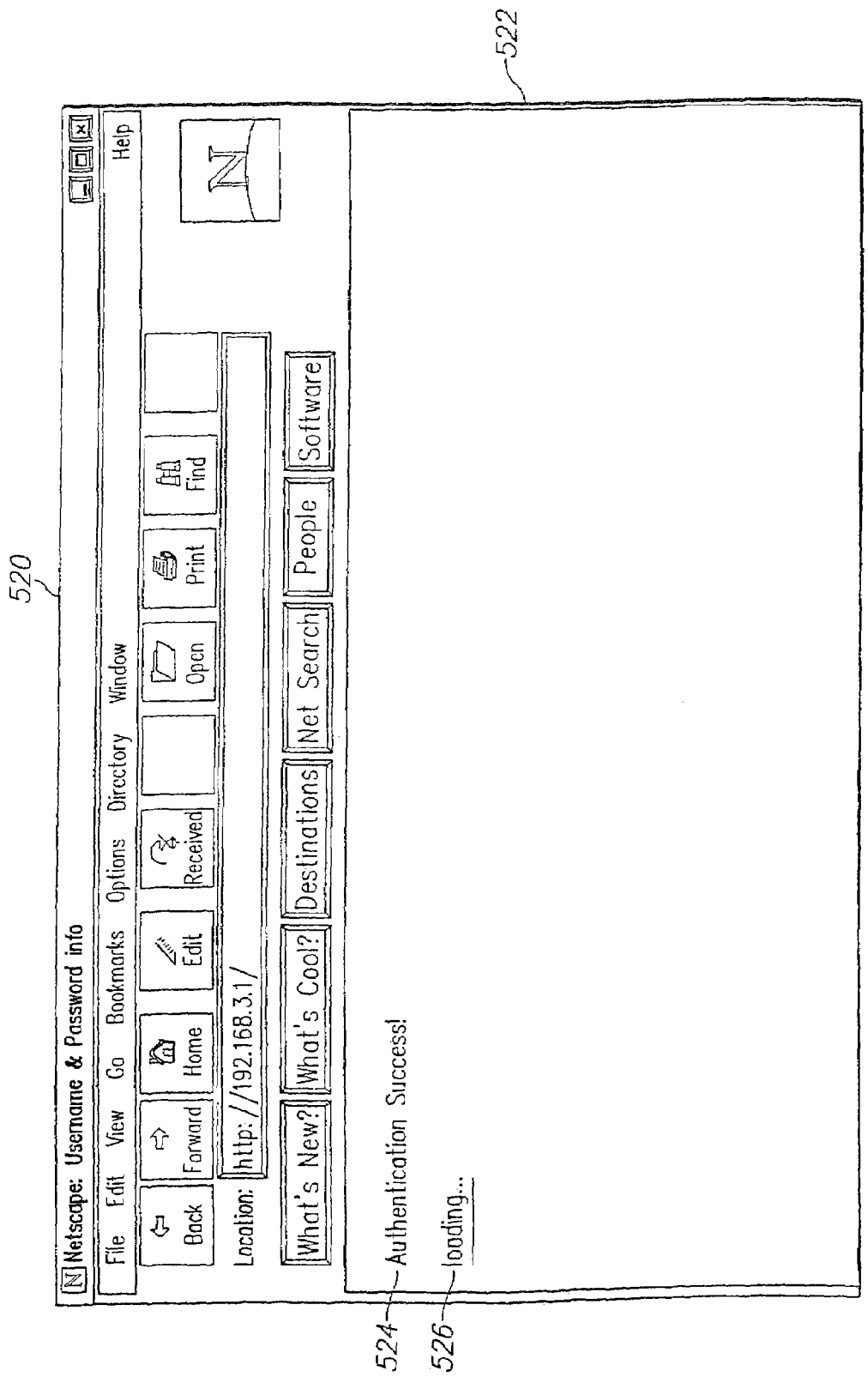
FIG. 5B illustrates a display of the graphical user interface informing of an authentication success.

FIG. 5B is an example of an HTML page that Authentication Proxy 400 may send to Client 306. Pane 522 of window 520 contains an "Authentication Successful" message 524.

Pane 522 also includes a second message 526 informing Client 306 that further action is being taken. For example, the second message 526 may inform Client 306 that the resource originally requested from target server 222 is now being loaded or accessed. In the preferred embodiment, the original HTTP request is automatically forwarded by firewall router 210 to target server 222 without further intervention by Client 306 or User 302. Thus, Authentication Proxy 400 automatically interrupts and resumes the request.

As shown in block 738, the process waits. For example, after Authentication Proxy 400 sends the "Authentication Success" message 524 to User 302, the Authentication Proxy enters a wait state for a short, pre-determined period of time. During the wait state, a short period of time is allowed to elapse to enable client 306 and firewall router 210 to communicate handshaking messages and carry out related processing associated with establishing an HTTP connection. The delay period also allows the firewall router enough time to execute any commands that are issued as part of block 734. In one embodiment, a period of three (3) seconds elapses.

In block 740, the process sends a page reload instruction to the client. For example, after the delay period, Authentication Proxy 400 sends one or more messages to Client 306 that instruct the client to reload the target URL, as indicated by path 408b of FIG. 4. In response, Client 306 re-issues the original HTTP request for a resource on target server 222. By the time that the re-issued HTTP request arrives from Client 306 at firewall router 210, the firewall router has been re-configured to provide an logical path 409 circumscribed only by the user profile of User 302 for the connection to the target server using the process described further below. Similarly, return traffic may travel from target server 222 to Client 306 on path 410 subject to the authorization information of the user profile of User 302.

If the authentication is not successful, as shown in block 736 and block 738, the process may notify the client with an appropriate message or page, and block traffic from the source IP address. Alternatively, Authentication Proxy 400 may permit Client 306 to re-try authentication a predetermined number of times.

Creating a Path Through the Firewall Using Dynamic Access Control Lists

When User 302 is authenticated successfully, Authentication Proxy 400 causes a user profile of User 302 to be downloaded from the AAA server 218 to the firewall router 210. Authentication Proxy 400 uses the user profile to dynamically configure the external interface 420 and internal interface 422 of firewall router 210 to provide a passageway for network traffic that initiates from User 302 on client 306. In this way, the types of traffic as specified by the user profile of User 302 and initiating from User 302 in the current session will pass freely through firewall router 210 to its destination.

In one embodiment, an authorized passageway through firewall router 210 is created using dynamic access control lists. In this embodiment, one or more entries may be added dynamically to each access control list 424, 426, 428, 430 of external interface 420 and internal interface 422.

When Authentication Proxy 400 sends a successful login confirmation message to User 302, a user profile of User 302 is downloaded from AAA server 218. In the preferred embodiment, the user profile is stored and retrieved in the form of one or more text commands, called proxy-access-list commands. Authentication Proxy 400 parses the proxy-access-list commands. Table 2 below contains samples of proxy-access-list commands. As each command is parsed, Authentication Proxy 400 replaces the source IP address field of the command with the IP address of the client 306, to result in a modified proxy-access-list command. Each modified proxy-access-list command is added as a temporary entry to the access control lists at the external interface 420 and internal interface 422. Specifically, proxy-access-list commands are added as temporary entries to the input ACL 424 of the router's external interface 420 and to the output ACL 430 of the router's internal interface 422. Thus, access control lists 424, 426, 428, 430 will grow and shrink dynamically as entries are added and deleted.

When the temporary entries have been added to the ACL at the appropriate interfaces of the firewall router 210, the state of the current authentication cache is set to the HTTP_FINWAIT state 604. The HTTP_FINWAIT state 604 indicates that the authentication cache is associated with an authenticated user, but that its associated client is not yet connected to a target server.

TABLE 2

EXAMPLE PROXY-ACCESS-LIST COMMANDS permit tcp host 192.168.25.215 any eq telnet
permit tcp host 192.168.25.215 any eq ftp
permit tcp host 192.168.25.215 any eq ftp-data
permit tcp host 192.168.25.215 any eq smtp
deny tcp any any eq telnet
deny udp any any
permit tcp any any (76 matches)
permit ip any any Authentication Cache Inactivity Timers Each authentication cache may have an inactivity timer. In the preferred embodiment, an inactivity cache is a software process that is maintained for each authentication cache based on the amount of traffic coming through firewall router 210 from Client 306. If the amount of traffic through the router for a particular client falls below a pre-determined threshold over a predetermined period of time, then Authentication Proxy 400 generates an idle timeout event.

When an idle timeout event is generated for a particular client, Authentication Proxy 400 deletes the authentication cache associated with that client, and deletes all temporary entries in the access control lists that are associated with that particular client. This approach saves memory and ensures that the ACLs are regularly pruned.

For example, assume that the pre-determined inactivity timer value is 60 minutes. If Client 306 does not initiate any network traffic through the firewall router 210 for 60 minutes or more, then any subsequent traffic initiated from client 306 will be denied passage through the firewall router 210. In one embodiment, Authentication Proxy 400 will prompt User 302 to renew authentication for a new HTTP connection.

Preferably, the temporary entries in the ACLs are not automatically deleted when a user terminates a session. Instead, the temporary entries remain stored until the configured timeout is reached, or until they are specifically deleted by the system administrator. Using this process, the user is not required to log in a second time in the event of an inadvertent or transient disconnection, but unused entries are removed from the ACLs when a true idle condition occurs.

In addition, each temporary entry to an ACL 424, 426, 428, 430 is linked to an associated authentication cache 432, 434. Preferably, a temporary entry of an ACL is linked to an associated authentication cache by hashing the temporary entries and storing the hashed entries in the hash table that is maintained by the authentication cache.

Connection and Communication with Target Server

When the interfaces of firewall router 210 have been configured with the new temporary entries in the ACLs, the result is that a logical passageway is opened through the firewall to allow certain types of traffic specified in the user profile of User 302 and initiating from Client 306 to pass unobstructed to target server 222. Using standard HTTP request-response communications, Client 306 establishes an HTTP connection to target server 222. When the connection to target server 222 is established, Authentication Proxy 400 changes the state of the authentication cache associated with the User 302 to the HTTP_ESTAB state 606.

As long as an idle timeout event does not occur, an authentication cache associated with a client remains valid. As long as the authentication cache associated with a client remains valid, the firewall router 210 does not attempt to intercept any subsequent traffic initiating from that client.

For example, assume that Client 306 continues to initiate network traffic or packets for passage through the firewall router 210 at least once every 60 minutes. Thus, the authentication cache 436 associated with client 306 remains valid and is not removed. Corresponding entries in the ACLs 424, 426, 428, 430 also remain valid. When a packet arrives at the firewall router 210, Authentication Proxy 400 determines that the source IP address of the packet matches an entry in the authentication cache 436. Accordingly, Authentication Proxy 400 will allow the packet to pass through firewall router 210.

Moreover, subsequent traffic initiating from client 306 may travel to any destination, as specified by the temporary entries to the dynamic ACLs that are associated with client 306. When a packet from client 306 arrives at firewall router 210, Authentication Proxy 400 checks the hashed entries in the authentication cache 436 for a match in the destination IP address. If a match is found, then the Authentication Proxy 400 will allow the packet to pass through firewall router 210 to the specified destination.

In addition, the temporary entries to the dynamic ACLs 424, 426, 428, 430 may specify various permissible communication protocols that client 306 may use. Thus, client 306 may initiate network traffic using any communication protocol specified in its associated temporary ACL entries, as long as an idle timeout event has not occurred. The client 306 is not restricted to TCP/IP protocol that was used to send the initial HTTP request. Examples of other communication protocols that client 306 may use include telnet, Internet Control Message Protocol ("ICMP"), and File Transfer Protocol ("FTP").

Hardware Overview

FIG. 1 is a block diagram that illustrates a computer system 100 upon which an embodiment of the invention may be implemented. In one embodiment, computer system 100 is a firewall device, such as a router.

Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as non-volatile random-access memory (NVRAM), is provided and coupled to bus 102 for storing information and instructions.

Computer system 100 may be coupled via communication interface 117 to a terminal 112, such as a cathode ray tube (CRT) dumb terminal or workstation, for receiving command-line instructions from and displaying information to a computer user. Terminal 112 includes an input device such as a keyboard, and may include a cursor control such as a mouse, a trackball, or cursor direction keys for communicating direction information and command selections to processor 104.

Computer system 100 has a switching system 116 which provides a plurality of links or interfaces to a network. Switching system 116 provides a way to connect an incoming network link 114 to an outgoing network link 118. There may be many links 114, 118.

The invention is related to the use of computer system 100 for regulating packet traffic in an integrated services network. According to one embodiment of the invention, regulating packet traffic in an integrated services network is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, NVRAM, such as storage device 110, or magnetic or optical disks. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 117 coupled to bus 102. Communication interface 117 provides a two-way data communication coupling to a network link 120 that is connected to a local network 122. For example, communication interface 117 may be an integrated services digital network (ISDN) card or a modem to provide a data communication connection to a corresponding type of telephone line. As another example, communication interface 117 may be a local area network (LAN) card to provide a data communication connection to a compatible LAN. Wireless links may also be implemented. In any such implementation, communication interface 117 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 117, which carry the digital data to and from computer system 100, are exemplary forms of carrier waves transporting the information.

Computer system 100 can send messages and receive data, including program code, through the network(s), network link 120 and communication interface 117. In the Internet example, a server 130 might transmit a requested code for an application program through Internet 128, ISP 126, local network 122 and communication interface 117. In accordance with the invention, one such downloaded application provides for regulating packet traffic in an integrated services network as described herein.

The received code may be executed by processor 104 as it is received, and/or stored in storage device 110, or other non-volatile storage for later execution. In this manner, computer system 100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for controlling access of a client to a network resource, the system comprising:
   a network resource that is communicatively coupled to a network;
   a network firewall routing device that is communicatively coupled to the network and that is logically interposed between the client and the network resource, wherein the network firewall routing device comprises:
      a firewall that protects the network resource by means for selectively blocking messages initiated by client and directed to the network resource, wherein the firewall comprises:
         an external interface and an internal interface; and
         an Output Access Control List at the internal interface and an Input Access Control List at the external interface;
   an authentication server that is communicatively coupled to the network and to the network firewall routing device and comprising user profile information;
   means for creating and storing client authorization information at the network firewall routing device, based in part on the user profile information, wherein the client authorization information comprises information indicating whether the client is authorized to communicate with the network resource and information indicating what access privileges the client has with respect to the network resource;
   means for receiving a request from the client to communicate with the network resource;
   means for determining whether the client is authorized to communicate with the network resource based on the authorization information; and
   means for reconfiguring the network firewall routing device to permit the client to communicate with the network resource only when the client is authorized to communicate with the network resource based on the authorization information, wherein the means for reconfiguring the network firewall routing device opens a logical passageway for network traffic from the client, wherein the logical passageway does not automatically close when a user terminates a session, and wherein the means for reconfiguring the network firewall routing device further comprises:
      means for determining a current IP address of the client;
      means for creating a new user profile information, based on the user profile information, that includes the current IP address; and
      means for adding the new user profile information as temporary entries to the Input Access Control List at the external interface and to the Output Access Control List at the internal interface.

2. A system as recited in claim 1, wherein the means for creating and storing client authorization information comprises means in the network firewall routing device for caching client authorization information for each client that communicates with the network firewall routing device.

3. A system as recited in claim 1, wherein the client authorization information comprises an authentication cache in the network firewall routing device for each client that communicates with the network firewall routing device.

4. A system as recited in claim 1, wherein the client authorization information comprises:
   a plurality of authentication caches,
      wherein each authentication cache is uniquely associated with one of a plurality of clients that communicate with the network routing device, and
      wherein each authentication cache comprises:
         information indicating whether the client is authorized to communicate with the network resource, and
         information indicating what access privileges the client is authorized to have with respect to the network resource.

5. A system as recited in claim 1, wherein the means for determining whether the client is authorized to communicate with the network resource comprises means for matching information in the request identifying the client to information in means for filtering in the network routing device and to the authorization information stored in the network firewall routing device.

6. A system as recited in claim 1, wherein the means for determining whether the client is authorized to communicate with the network resource comprises:
   means for matching a source IP address of the client in a data packet of the request to information in a filtering mechanism of the network routing device; and
   means for matching the source IP address to the authorization information stored in the network firewall routing device if the source IP address matches the information in the filtering mechanism of the network routing device.

7. A system as recited in claim 1, wherein the means for determining whether the client is authorized to communicate with the network resource comprises:
   means for matching a source IP address of the client in a data packet of the request to information in a means for filtering in the network routing device;
   means for matching the source IP address to the authorization information stored in the network firewall routing device if the source IP address matches the information in the filtering mechanism of the network routing device; and
   means for matching user identifying information received from the client to a profile associated with the user that is stored in the authentication server if the source IP address fails to match the authorization information stored in the network firewall routing device.

8. A system as recited in claim 1, wherein the means for determining whether the client is authorized to communicate with the network resource comprises:
   means for matching a source IP address of the client in a data packet of the request to information in a filtering mechanism of the network routing device;
   means for matching the source IP address to the authorization information stored in the network firewall routing device if the source IP address matches the information in the filtering mechanism of the network routing device; and means for matching user identifying information received from the client to a profile associated with the user that is stored in a database server and is retrieved from the database server by the authentication server, if the source IP address fails to match the authorization information stored in the network firewall routing device.

9. A system as recited in claim 1, wherein the means for determining whether the client is authorized to communicate with the network resource comprises:
  means for matching client identifying information in the request to information in a filtering mechanism of the network routing device;
  means for matching the client identifying information to the authorization information stored in the network firewall routing device, if a match is found using the filtering mechanism; and
  means used, only when the client identifying information fails to match the authorization information stored in the network firewall routing device, for:
    creating and storing new authorization information in the network firewall routing device that is uniquely associated with the client;
    requesting login information from the client;
    authenticating the login information by communicating with the authentication server; and
    updating the new authorization information based on information received from the authentication server.

10. A system as recited in claim 9, wherein the means for requesting login information from the client comprises means for sending a Hypertext Markup language login form from the network firewall routing device to the client to solicit a username and a user password; and wherein the means for authenticating the login information comprises means for determining, from a profile associated with a user of the client stored in the authentication server, whether the username and password are valid.

11. A system as recited in claim 9, wherein the means for requesting login information from the client comprises means for sending a Hypertext Markup language login form from the network firewall routing device to the client to solicit a username and a user password; and wherein the means for authenticating the login information comprises:
  means for retrieving a profile associated with a user of the client from a database server;
  and means for determining, from the profile associated with the user, whether the username and password are valid.

12. A system as recited in claim 9, the system further comprising:
  means for creating and storing an inactivity timer for each authorization information, wherein the inactivity timer expires when no communications are directed from the client to the network resource through the network firewall routing device during a pre-determined period of time;
  means for removing the updated authorization information when the inactivity timer expires.

13. A system as recited in claim 1, wherein the means for determining whether the client is authorized to communicate with the network resource comprises:
  means for matching a source IP address in the request to information in a filtering mechanism of the network routing device;
  means for matching the source IP address to the authorization information stored in the network firewall routing device using an authentication cache in the network firewall routing device; and
  means used, only when the source IP address fails to match the authorization information stored in the network firewall routing device, for:
    creating and storing a new entry in the authentication cache that is uniquely associated with the client;
    requesting login information from the client;
    authenticating the login information by communicating with the authentication server; and
    updating the new entry in the authentication cache based on information received from the authentication server.

14. A system as recited in claim 1, wherein the means for reconfiguring the network firewall routing device comprises means for creating and storing one or more commands to the network firewall routing device which, when executed by the network firewall routing device, result in modifying one or more routing interfaces of the network firewall routing device to permit communications between the client and the network resource.

15. A system for controlling access to a network resource, the system comprising:
  a network resource that is communicatively coupled to a network;
  a client capable of sending a request to communicate with the network resource;
  a network firewall routing device that is logically interposed between the client and the network resource and is capable of permitting the client to communicate with the network resource, wherein the network firewall routing device comprises:
    a firewall that protects the network resource by selectively blocking messages initiated by client and directed to the network resource, wherein the firewall comprises:
      an external interface and an internal interface; and
      an Output Access Control List at the internal interface and an Input Access Control List at the external interface;
  an authentication server that is communicatively coupled to the network and to the network firewall routing device and comprising user profile information;
  means for creating and storing client authorization information at the network firewall routing device, wherein the client authorization information comprises information indicating whether the client is authorized to communicate with the network resource and information indicating what access privileges the client has with respect to the network resource;
  means for determining, at the network firewall routing device, whether the client is authorized to communicate with the network resource based on the authorization information; and
  means for reconfiguring the network firewall routing device to permit the client to communicate with the network resource only when the client is authorized to communicate with the network resource based on the authorization information, wherein the means for reconfiguring the network firewall routing device opens a logical passageway for network traffic from the client, wherein the logical passageway does not automatically close when a user terminates a session, and wherein the means for reconfiguring the network firewall routing device further comprises:
  means for determining a current IP address of the client;
  means for creating a new user profile information, based on the user profile information, that includes the current IP address; and means for adding the new user profile information as temporary entries to the Input Access Control List at the external interface and to the Output Access Control List at the internal interface.

16. A system as recited in claim 15, wherein the client authorization information comprises:
a plurality of authentication caches,
wherein each authentication cache is uniquely associated with one of a plurality of clients that communicate with the network routing device, and
wherein each authentication cache comprises:
information indicating whether the client is authorized to communicate with the network resource, and
information indicating what access privileges the client is authorized to have with respect to the network resource.

17. A system as recited in claim 15, wherein the means for determining whether the client is authorized to communicate with the network resource comprises:
means for matching client identifying information in the request to information in a filtering mechanism of the network routing device; and
means for matching the client identifying information in the request to the authorization information stored in the network firewall routing device if the client identifying information in the request matches the information in the filtering mechanism of the network routing device.

18. A system as recited in claim 15, wherein the means for determining whether the client is authorized to communicate with the network resource comprises:
means for matching client identifying information in the request to information in a filtering mechanism of the network routing device;
means for matching a source IP address to the authorization information stored in the network firewall routing device if the client identifying information in the request matches the information in the filtering mechanism of the network routing device; and
means for matching user identifying information received from the client to a profile associated with the user that is stored in a database server and is retrieved from the database server by an authentication server that is coupled to the network firewall routing device, if the client identifying information in the request fails to match the authorization information stored in the network firewall routing device.

19. A system as recited in claim 15, wherein the means for determining whether the client is authorized to communicate with the network resource comprises:
means for matching client identifying information in the request to information in a filtering mechanism of the network routing device;
means for matching the client identifying information in the request to the authorization information stored in the network firewall routing device using an authentication cache in the network firewall routing device; and
means, used only when the client identifying information in the request fails to match the authorization information stored in the network firewall routing device, for:
creating and storing a new entry in the authentication cache that is uniquely associated with the client;
requesting login information from the client;
authenticating the login information by communicating with the authentication server; and
updating the new entry in the authentication cache based on information received from the authentication server.

20. A system as recited in claim 19, wherein the means for requesting login information from the client comprises means for sending a Hypertext Markup language login form from the network firewall routing device to the client to solicit a username and a user password; and wherein the means for authenticating the login information by communicating with the authentication server comprises:
means for retrieving a profile associated with a user of the client from a database server; and
means for determining, from the profile associated with the user, whether the username and password are valid.

21. A system as recited in claim 15, wherein the client is a computer system executing a Web browser.

22. A system for authentication comprising:
a network resource connected to a network;
a client capable of sending a request to communicate with the network resource;
a network firewall routing device that is logically interposed between the client and the network resource and that is reconfigured to permit the client to communicate with the network resource only when the client is authorized to communicate with the network resource based on client authorization information stored in the network firewall routing device, wherein the network firewall routing device comprises:
a firewall that protects the network resource by means for selectively blocking messages initiated by client and directed to the network resource, wherein the firewall comprises:
an external interface and an internal interface;
an Output Access Control List at the internal interface and an Input Access Control List at the external interface;
wherein the network firewall routing device, when reconfigured, is reconfigured by the steps of:
determining a current IP address of the client;
creating a new user profile information, based on the user profile information, that includes the current IP address; and
adding the new user profile information as temporary entries to the Input Access Control List at the external interface and to the Output Access Control List at the internal interface;
wherein the network firewall routing device, when reconfigured, opens a logical passageway for network traffic from the client, wherein the logical passageway does not automatically close when a user terminates a session, and
wherein the client authorization information comprises information indicating whether the client is authorized to communicate with the network resource and information indicating what access privileges the client has with respect to the network resource;
a database server that stores a plurality of user profiles, each user profile uniquely associated with one of a plurality of users that can use the client to send requests to communicate with the network resource;
an authentication server that is logically interposed between the network firewall routing device and the database server, and that is capable of communicating with the database server and retrieving from the database server a user profile.

23. A system as recited in claim 22, wherein the network resource comprises a target server capable of servicing a request sent under at least one of HyperText Transfer Protocol; File Transfer Protocol; and Internet Control Message Protocol.

24. A system as recited in claim 22, wherein the client comprises a computer system executing a Web browser.

25. A system as recited in claim 22, wherein the network firewall routing device comprises:
   one or more processors; and
   a storage medium carrying one or more sequences of one or more instructions including instructions which, when executed by the one or more processors, cause the one or more processors to perform the steps of:
      creating and storing the client authorization information at the network firewall routing device;
      receiving the request from the client to communicate with the network resource;
      determining whether the client is authorized to communicate with the network resource based on the client authorization information; and
      permitting the client to communicate with the network resource only when the client is authorized to communicate with the network resource based on the client authorization information.

26. A system as recited in claim 25, wherein permitting the client to communicate with the network resource comprises the steps of creating and storing one or more commands which, when executed by the network firewall routing device, result in modifying one or more routing interfaces of the network firewall routing device to permit communications between the client and the network resource.

27. A system as recited in claim 25, wherein determining whether the client is authorized to communicate with the network resource comprises the steps of:
   determining whether client identifying information in the request matches information in a filtering mechanism of the network firewall routing device;
   if a match is found using the filtering mechanism, determining whether the client identifying information matches the client authorization information stored in the network firewall routing device; and
   only when the client identifying information fails to match the client authorization information stored in the network firewall routing device, then:
      creating and storing new client authorization information in the network firewall routing device that is uniquely associated with the client;
      requesting login information from the client;
      authenticating the login information by communicating with the authentication server; and
      updating the new client authorization information based on information received from the authentication server.

28. A system as recited in claim 27, wherein:
   requesting login information from the client comprises sending a Hypertext Markup Language login form to the client to solicit a username and a password; and
   authenticating the login information by communicating with the authentication server comprises determining, from a profile that is associated with a user of the client and that is retrieved from the database server, whether the username and password are valid.

29. A system as recited in claim 22, wherein the authentication server comprises:
   one or more processors; and
   a storage medium carrying one or more sequences of one or more instructions including instructions which, when executed by the one or more processors, cause the one or more processors to perform the steps of:
      receiving client identifying information from the network firewall routing device, wherein the client identifying information comprises a username and a password associated with a user of the client;
      retrieving a profile associated with the user from the database server;
      determining whether the username and the password in the client identifying information match the username and the password stored in the profile associated with the user; and
      only if a match is found, returning to the network firewall routing device information indicating that the username and the password are valid.

30. A system as recited in claim 22, wherein the database server comprises:
   one or more processors; and
   a storage medium carrying one or more sequences of one or more instructions including instructions which, when executed by the one or more processors, cause the one or more processors to perform the steps of:
      storing a profile associated with a user of the client, wherein the profile comprises a username and a password; and
      retrieving the profile associated with a user of the client upon a request from the authentication server.

* * * * *